J. J. BAUSCH.
METHOD OF MAKING EYEPIECE CAPS.
APPLICATION FILED JAN. 25, 1917.
1,254,646.
Patented Jan. 29, 1918.
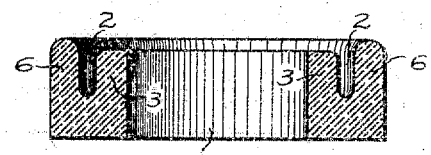
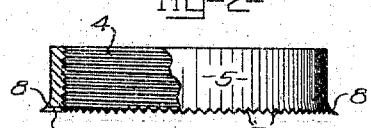
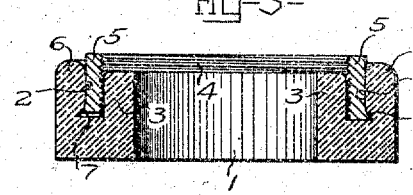
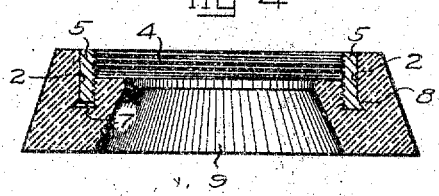
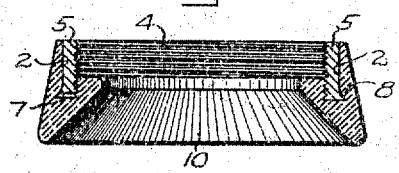
INVENTOR
John J. Bausch
BY
his ATTORNEYS.

UNITED STATES PATENT OFFICE.

JOHN J. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

METHOD OF MAKING EYEPIECE-CAPS.

1,254,646.  Specification of Letters Patent.  Patented Jan. 29, 1918.

Application filed January 25, 1917. Serial No. 144,362.

*To all whom it may concern:*

Be it known that I, JOHN J. BAUSCH, a citizen of the United States, residing at Rochester, in the county of Monroe, State of New York, have invented certain new and useful Improvements in Method of Making Eyepiece-Caps; and I do declare the following to be a full, clear, and exact description of the invention, reference being had to the accompanying drawings and to the characters of reference marked thereon.

This invention relates to caps or guards adapted to be fitted to the outer ends of eye pieces of a large variety of optical instruments for guarding the eye piece and its contained lenses from injury and for facilitating adjustment of the eye to the instrument.

The invention has for its object to provide an improved method of making an eye piece cap which has a pleasing appearance, and is light in weight and has great strength assuring maximum durability and which permits the use of a comparatively light vulcanizable compound for compressive incorporation with a screw threaded or grooved or otherwise machined reinforcing ferrule around which the compound is vulcanized and is later reduced to finished form by removing surplus material.

In the drawings:

Figure 1 is a cross sectional view of a ring of semi-plastic vulcanizable compound first formed in the now preferred process of making the eye piece. Fig. 2 is a partially broken out sectional side view of one form of reinforcing ferrule later incorporated with the compound ring by pressure and vulcanization. Fig. 3 is a sectional view showing the ferrule placed within the face groove of the unvulcanized compound ring. Fig. 4 shows in cross section, the ring and metal ferrule as when intimately combined by compression in a mold and after vulcanization therein; and Fig. 5 is a cross sectional view of the improved eye piece cap in its final form.

Like characters of reference throughout the various figures of the drawings represent the same parts.

In carrying out this invention it is entirely practicable to use any comparatively light plastic or semi-plastic compound which may be compressed in a mold and then be vulcanized therein around parts of a screw threaded or grooved or otherwise machined reinforcing metal ferrule of the eye piece. Such semi-plastic compound may be and now preferably is a comparatively inexpensive material commonly known as unvulcanized compound having a proper degree of plasticity and toughness to allow sheets or plates rolled or pressed from it to be readily cut and shaped by dies, or to allow the compound to be molded to proper form, for subjection whether die shaped or molded to the various subsequent operations involved in the cap forming process.

The drawings illustrate by way of example the production of an eye piece cap having incorporated with the plastic vulcanizable compound a reinforcing metal ferrule having an internal screw thread, but a ferrule having an external thread or one that is internally or externally grooved or otherwise machined may be used if desired. Fig. 1 shows a ring 1 of the above named vulcanizable compound which may either be die-cut and shaped by a single blow from a sheet or plate of the compound, or may be molded from a plastic mass of said compound. This ring has an annular face groove 2, and the groove wall 3 to later be next or facing the screw thread 4 of the applied metal ferrule 5, is depressed below the level of the opposite groove wall 6, but should an externally screw threaded ferrule be used the inner groove wall would be higher than its outer wall. After the ring 1 is formed, the metal ferrule 5, shown separately in Fig. 2, is inserted within the ring groove 2, as shown in Fig. 3. This ferrule has serrations 7 at its inner edge and also has preferably at its face opposite that in which the screw thread 4 is formed, and next its inner edge, a flaring portion 8.

The formed plastic compound ring 1, now holding the screw ferrule 5, is placed in a preferably heated compressing mold and is therein reduced to the form illustrated in Fig. 4, which shows that the vulcanizable compound of the ring 1, is forced into intimate interlocking engagement with the screw thread 4, the flared edge portion 8 and the edge serrations 7, of the metal ferrule 5. The parts are thus interlocked under compression and in relation shown in Fig. 4, wherein the compressed compound ring is marked 9, because it differs in form from that of the unvulcanized ring 1 of Figs. 1 and 3, of the drawings. The mold is now subjected to heat in the usual manner to vulcanize the rubber compound around the ferrule and when removed from the vulcanizing mold the parts have the relative form and arrangement shown in Fig. 4. It then is preferred to manually or otherwise remove any compound from those parts of the ferrule threads 4 not embedded in the vulcanized ring which then is turned or otherwise reduced to remove surplus material and thus give the eye piece the finished form shown at 10, in Fig. 5 of the drawings. The vulcanized compound of the cap now is given any desired external finish and the cap now is ready for application to the lens holding eye piece of a field-glass, opera-glass, microscope, telescope or other optical instrument by simply engaging the exposed cap thread 4, with an external thread of the eye piece.

It will be specially noticed that the forcing of the plastic compound into the ferrule serrations 7, by compression in the vulcanizing mold absolutely prevents turning of the ferrule in the finished cap, and the simultaneous forcing of the compound into the ferrule screw thread 4, and also over its flared edge portion 8, as surely prevents axial withdrawal or coming out of the ferrule from the eye piece cap which thus while having light weight and pleasing form also has great durability under any necessary conditions of use.

The ferrule 5 is preferably made of metal or metal composition, and is hereinabove referred to as a metal ferrule, but it is obvious that the ferrule may be formed from any substance or compound in or on which a durable screw thread may be cut, or which may be grooved or otherwise undercut or machined to assure its interlocking or overlocking engagement with the vulcanizable compound, and which will not be injuriously affected by pressure incident to incorporation of the ferrule with the vulcanizable compound, or by heat during the vulcanizing process.

The special reason for forming that wall of the groove 2 of the unvulcanized compound ring which lies next the screw thread of the inserted ferrule, at a lower level than that of the opposite groove wall, is that less pressure is required to assure necessary displacement of the unvulcanized compound at the screw threaded face of the ferrule during intimate incorporation of the ferrule with the compound ring and the shaping of the ring prior to vulcanization.

Having thus described my invention, what I claim and desire to secure by Letters Patent of the United States is:

1. The method of making eye piece caps for optical instruments, consisting in forming from a semi-plastic vulcanizable compound a ring having an annular face groove, placing a machined ferrule within said groove, pressing the unvulcanized ring compound into intimate contact with portions of the ferrule, vulcanizing said compressed compound around the ferrule, and removing surplus material from the vulcanized compound ring to reduce it to finished form.

2. The method of making eye piece caps for optical instruments, consisting in forming from a semi-plastic vulcanizable compound, a ring having an annular face groove whose opposite walls have unequal heights, placing within said groove a ferrule having a machined portion facing the lower groove wall, pressing the unvulcanized ring compound into intimate contact with portions of the ferrule and into shape to be reduced to finished form, vulcanizing said compressed compound around the ferrule, and finishing the cap by removing surplus material from the vulcanized compound ring.

3. The method of making eye piece caps for optical instruments, consisting in forming from a semi-plastic vulcanizable compound a ring having an annular face groove, placing within said groove a screw threaded ferrule having serrations at its inner portion, pressing the unvulcanized ring compound into intimate contact with the ferrule screw thread and serrations, vulcanizing said compressed compound around the ferrule, and removing surplus material from the vulcanized compound ring to reduce it to finished form.

4. The method of making eye piece caps for optical instruments, consisting in forming from a semi-plastic vulcanizable compound a ring having an annular face groove, placing within said groove a screw threaded ferrule having a flare at its inner portion, pressing the unvulcanized ring compound into intimate contact with the ferrule screw thread and flare, vulcanizing said compressed compound around the ferrule, and removing surplus material from the vulcanized compound ring to reduce it to finished form.

5. The method of making eye piece caps for optical instruments, consisting in forming from a semi-plastic vulcanizable compound a ring having an annular face groove, placing within said groove a screw threaded ferrule having inner edge serrations and an adjacent flaring side portion, pressing the unvulcanized ring compound into intimate contact with the screw thread, the serrations and the flare of the ferrule, vulcanizing said compressed compound around the ferrule, and removing surplus material from the vulcanized compound ring to reduce it to finished form.

JOHN J. BAUSCH.